United States Patent
Sethy et al.

(10) Patent No.: US 9,524,716 B2
(45) Date of Patent: Dec. 20, 2016

(54) SYSTEMS AND METHODS FOR PROVIDING UNNORMALIZED LANGUAGE MODELS

(71) Applicant: Nuance Communications, Inc., Burlington, MA (US)

(72) Inventors: Abhinav Sethy, Yorktown Heights, NY (US); Stanley Chen, Yorktown Heights, NY (US); Bhuvana Ramabhadran, Yorktown Heights, NY (US); Paul J. Vozila, Arlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/689,564

(22) Filed: Apr. 17, 2015

(65) Prior Publication Data

US 2016/0307564 A1    Oct. 20, 2016

(51) Int. Cl.
  *G10L 15/00* (2013.01)
  *G10L 15/16* (2006.01)
  *G10L 15/06* (2013.01)

(52) U.S. Cl.
  CPC .............. *G10L 15/16* (2013.01); *G10L 15/063* (2013.01)

(58) Field of Classification Search
  CPC ................................ G10L 15/16; G10L 15/063
  See application file for complete search history.

(56) References Cited

U.S. PATENT DOCUMENTS

2014/0156575 A1*  6/2014  Sainath ................... G06N 7/005
                                                                706/16
2015/0095026 A1*  4/2015  Bisani ..................... G10L 15/32
                                                                704/232

OTHER PUBLICATIONS

Arisoy et al., Converting neural network language models into back-off language models for efficient decoding in automatic speech recognition, IEEE/ACM Transactions on Audio, Speech and Language Processing, Jan. 2014, 22(1):184-92.
Bengio et al., A Neural Probabilistic Language Model, Journal of Machine Learning Research, Feb. 2003, 3:1137-55.
Chen et al., Advances in speech transcription at IBM under the DARPA EARS program, IEEE Trasactions on Audio, Speech, and Language Processing, Sep. 2006, 14(5):1596-1608.
Chen et al., Scaling Shrinkage-Based Language Models, Tech. Rep. RC24970, IBM Research Division, Apr. 2010, 6 pages, Yorktown Heights, NY.
Chen et al., Scaling Shrinkage-Based Language Models, Tech. Rep. RC24970, IBM Research Division, Apr. 2010, 21 pages, Yorktown Heights, NY.

(Continued)

*Primary Examiner* — Qian Yang
(74) *Attorney, Agent, or Firm* — Wolf, Greenfield & Sacks, P.C.

(57) ABSTRACT

Some embodiments relate to using an unnormalized neural network language model in connection with a speech processing application. The techniques include obtaining a language segment sequence comprising one or more language segments in a vocabulary; accessing an unnormalized neural network language model having a normalizer node and an output layer comprising a plurality of output nodes, each of the plurality of output nodes associated with a respective language segment in the vocabulary; and determining, using the unnormalized neural network language model, a first likelihood that a first language segment in the vocabulary follows the language segment sequence.

14 Claims, 6 Drawing Sheets

(56) References Cited

OTHER PUBLICATIONS

Chen, Shrinking Exponential Language Models, Proceedings of NAACL-HLT, Jun. 2009, 46876, Boulder, CO.

Deoras et al., Variational approximation of long-span language models for LVCSR, 2011 IEEE International Conference on Acoustics, Speech, and Signal Processing, 22-7 May 2011, 5532-5, Prague, Czech Republic.

Emami et al., A neural syntactic language model, Machine learning, Sep. 2005, 60(1-3):195-227.

Gutmann et al., Noise-Contrastive Estimation of Unnormalized Statistical Models, with Applications to Natural Image Statistics, Journal of Machine Learning Research, Feb. 2012, 13(1):307-61.

Huang et al., Cache based recurrent neural network language model inference for first pass speech recognition, IEEE International Conference on Acoustics, Speech, and Signal Processing, May 4-9, 2014, 6354-8, Florence, Italy.

Kuo et al., Large Scale Hierarchical Neural Network Language Models, Interspeech, Sep. 9-13, 2012, 1672-5, Portland, OR.

Lebanon et al., Boosting and Maximum Likelihood for Exponential Models, Advances in Neural Information Processing Systems 14 Proceedings from Neural Information Processing Systems 2001 Conference, Dec. 2001, 8 pages.

Mikolov et al., Empirical Evaluation and Combination of Advanced Language Modeling Techniques, Interspeech, Aug. 28-31, 2011, 605-8, Florence, Italy.

Mnih et al., A fast and simple algorithm for training neural probabilistic language models, Proceedings of the $29^{th}$ International Conference on Machine Learning, Jun. 2012, 8 pages, Edinburgh, Scotland, UK.

Sainath et al., Deep convolutional neural networks for LVCSR, 2013 IEEE International Conference on Acoustics, Speech and Signal Processing, May 26-31, 2013, 8614-8, Vancouver, British Columbia, Canada.

Sainath et al., Improvements to Deep Convolutional Neural Networks for LVCSR, 2013 IEEE Workshop on Automatic Speech Recognition and Understanding (ASRU), Dec. 8-12, 2013, 315-20, Olomouc, Czech Republic.

Schwenk, Continuous space language models, Computer Speech and Language, Jul. 2007, 21(3):492-518.

Sethy et al., Distributed training of large scale exponential language models, 2011 IEEE International Conference on Acoustics, Speech, and Signal Processing, May 22-27, 2011, 5520-3, Prague, Czech Republic.

Sethy et al., Joint training of interpolated exponential n-gram models, 2013 IEEE Workshop on Automatic Speech Recognition and Understanding, Dec. 25-30, 2013, 25-30, Olomouc, Czech Republic.

Shi et al., Variance Regularization of RNNLM for Speech Recognition, 2014 IEEE International Conference on Acoustics, Speech, and Signal Processing (ICASSP), May 2014, 4893-7, Florence, Italy.

Vaswani et al., Decoding with large-scale neural language models improves translation, Proceedings of the 2013 Conference on EMNLP, Oct. 18-21, 2013, 1387-92, Seattle, WA.

Wu et al, Efficient Training Methods for Maximum Entropy Language Modeling, Proceedings of Interspeech for ICSLP 2000, Oct. 16-20, 2000, vol. 3: 114-8, Beijing, China.

\* cited by examiner

SYSTEMS AND METHODS FOR PROVIDING UNNORMALIZED LANGUAGE MODELS

BACKGROUND

Language modeling is used in many language processing applications such as automatic speech recognition (ASR), natural language understanding (NLU), information retrieval, and machine translation. Language modeling may involve using labeled or annotated language data to train one or more language models to capture properties of a language. A language model may be trained to capture the likelihood that a particular sequence of language segments (e.g., a sequence of phonemes, a sequence of syllables, a sequence of words, a sequence of phrases, etc.) occurs in the language.

SUMMARY

Some aspects of the technology described herein are directed to a method comprising using at least one computer hardware processor to perform: obtaining a language segment sequence comprising one or more language segments in a vocabulary, accessing an unnormalized neural network language model having a normalizer node and an output layer comprising a plurality of output nodes, each of the plurality of output nodes associated with a respective language segment in the vocabulary, and determining, using the unnormalized neural network language model, a first likelihood that a first language segment in the vocabulary follows the language segment sequence.

Some aspects of the technology described herein are directed to a system comprising at least one non-transitory computer-readable storage medium storing thereon an unnormalized neural network language model having a normalizer node and an output layer comprising a plurality of output nodes, each of the plurality of output nodes associated with a respective language segment in a vocabulary of language segments, and at least one computer hardware processor configured to perform a method. The method comprises obtaining a language segment sequence comprising one or more language segments in the vocabulary, accessing the unnormalized neural network language model stored on the at least one non-transitory computer-readable storage medium, and determining, using the unnormalized neural network language model, a first likelihood that a first language in the vocabulary follows the language segment sequence.

Some aspects of the technology described herein are directed to at least one non-transitory computer-readable storage medium storing processor-executable instructions that, when executed by at least one computer hardware processor, cause the at least one computer hardware processor to perform a method. The method comprises obtaining a language segment sequence comprising one or more language segments in a vocabulary, accessing an unnormalized neural network language model having a normalizer node and an output layer comprising a plurality of output nodes, each of the plurality of output nodes associated with a respective language segments in the vocabulary, and determining, using the unnormalized neural network language model, a first likelihood that a first language segment in the vocabulary follows the language segment sequence.

The foregoing is a non-limiting summary of the invention, which is defined by the attached claims.

BRIEF DESCRIPTION OF DRAWINGS

Various aspects and embodiments of the application will be described with reference to the following figures. The figures are not necessarily drawn to scale. Items appearing in multiple figures are indicated by the same or a similar reference number in all the figures in which they appear.

DETAILED DESCRIPTION

Figure 1:
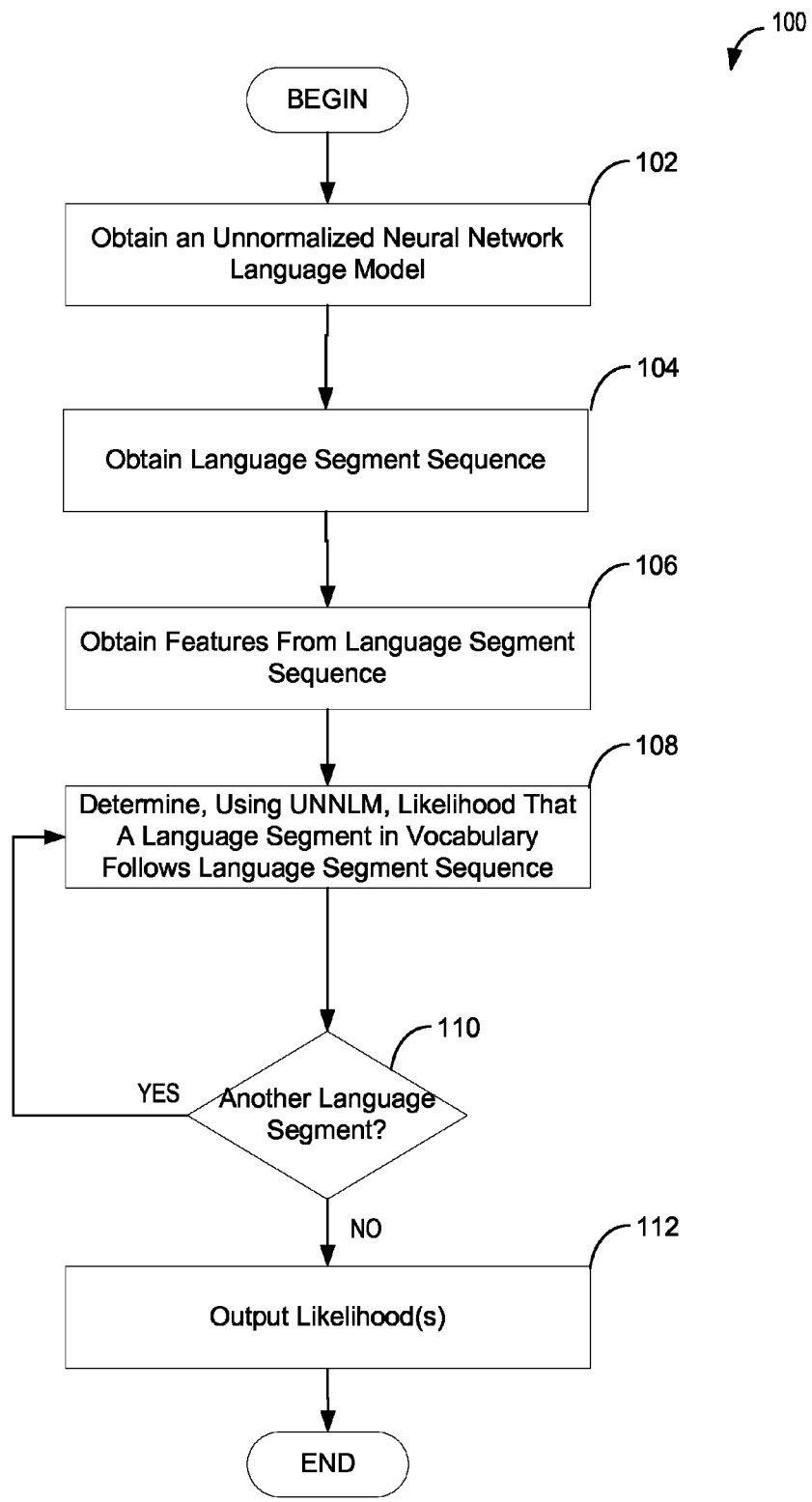
FIG. 1 is a flowchart of an illustrative process for determining a likelihood that a language segment in a vocabulary follows a language segment sequence at least in part by using an unnormalized neural network language model, in accordance with some embodiments of the technology described herein.

The inventors have appreciated that using conventional neural network language models (NNLMs) is computationally expensive and may be prohibitively so for a wide number of language processing applications in which language models are used (e.g., ASR, NLU, information retrieval, machine translation, etc.). For example, automated speech recognition may involve determining, using a conventional neural network language model, the probability that a particular word follows a sequence of one or more words. This determination entails using the conventional NNLM to: (1) compute an output score for each word in the vocabulary; and (2) normalize the output scores, via a so-called "soft-max" normalization, to compute the probability that the particular word follows the word sequence. These calculations are computationally expensive to perform, especially when the number of words in the vocabulary is large (e.g., 100,000 or more words, as the case may be in a large vocabulary speech recognition system), making the application of conventional neural network language models impractical or even impossible for many language processing applications.

As a specific example, a conventional neural network language model may include an output node for each word in a vocabulary having N=100,000 words, denoted by $\{w_1, \ldots, w_N\}$. In this case, determining the probability $p_i$ that a particular word (e.g., the ith word $w_i$) follows a sequence of one or more other words requires using the conventional neural network language model to: (1) compute an output score for each of the 100,000 words in the vocabulary, the output scores denoted by $\{o_1, \ldots, o_N\}$; and (2) normalizing the output scores via soft-max normalization to obtain the probability $p_i$ according to:

$$p_i = \frac{e^{o_i}}{\sum_{k=1}^{N} e^{o_k}}.$$

The above-equation illustrates that, in conventional NNLMs, the probability $p_i$ that a particular word follows a sequence of one or more other words depends on output scores for each of the words in the vocabulary. Accordingly, computing the probability $p_i$ requires computing an output score for each of the words in the vocabulary. Computing 100,000 output scores, for example, to evaluate the probability that a particular word follows a sequence of one or more words, which may be performed thousands of times when performing speech recognition of a single utterance, is computationally prohibitive.

The inventors have developed techniques for substantially reducing the computational burden of computing word sequence probabilities. Accordingly, some embodiments provide for unnormalized neural network language models (UNNLMs) that may be used to compute a likelihood that a particular language segment (e.g., a phoneme, a letter, a syllable, a word, a phrase, etc.) follows a language segment sequence of one or more language segments. In some embodiments, the likelihood may be computed based on output scores of two nodes in an UNNLM: (1) an output score of the output node in the UNNLM corresponding to the particular language segment; and (2) an output score of the normalizer node in the UNNLM, which may provide an estimate of the sum of output scores of all output nodes in the UNNLM that correspond to language segments in the vocabulary. In this way, the likelihood may be calculated based on an output score of the output node in the UNNLM corresponding to the particular language segment and an estimate of the quantity by which the output score would be normalized if explicit normalization were performed, but without the computational expense of performing explicit normalization (e.g., without the computational expense of computing output scores for all output nodes in the UNNLM, which may be substantial when the number of output nodes is large).

Accordingly, in some embodiments, the likelihood that a particular language segment follows a sequence of one or more language segments may be computed independently of output scores for any other language segments in the vocabulary, but may depend on an estimate of a sum of output scores for language segments in the vocabulary that, for example, may be provided by a normalizer node in the UNNLM. In turn, this likelihood may be used for any suitable language processing task (e.g., ASR, NLU, machine translation, information retrieval, etc.), without being normalized relative to likelihoods that other language segments may follow the language segment sequence and, in some embodiments, without even computing such likelihoods.

Thus, in some embodiments, an unnormalized neural network language model may be used to compute the likelihood that a particular language segment follows a language segment sequence and use this likelihood in performing a language processing task without needing to compute likelihoods that any other language segments in the vocabulary follow the language segment sequence. This results in significant computational savings relative to using conventional neural network language models that compute the probability that a particular language segment follows a language segment sequence by computing an output score for each of the language segments in the vocabulary, which is computationally prohibitive.

In some embodiments, using an unnormalized neural network language model to determine a likelihood that a language segment follows one or more language segments is performed by using the UNNLM to obtain an output score for the particular language segment, but without normalizing the obtained score based on output scores for other language segments in the vocabulary. For example, the likelihood that a language segment follows one or more language segments may be determined without using soft-max normalization, as is done when using conventional NNLMs. Rather, in some embodiments, an UNNLM may be trained by using a neural network training procedure, developed by the inventors, that encourages the sum of UNNLM likelihoods, which are calculated based at least in part on the output score of the normalizer node, to be close to one such that an explicit normalization step, as used when applying conventional NNLMs, is unnecessary. Thus, the computationally expensive runtime process of explicit normalization performed using conventional NNLMs can be avoided.

Some embodiments of the technology described herein address some of the above-discussed drawbacks of conventional neural network language models. However, not every embodiment addresses every one of these drawbacks, and some embodiments may not address any of them. As such, it should be appreciated that aspects of the technology described herein are not limited to addressing all or any of the above discussed drawbacks of conventional neural network language models.

In some embodiments, an unnormalized neural network language model may be used to compute a likelihood that a particular language segment in a vocabulary of language segments follows a sequence of one or more language segments. The unnormalized neural network language model may include a normalizer node and an output layer having multiple output nodes, each of the multiple output nodes corresponding to a respective language segment in the vocabulary. Computing the likelihood may include: (1) obtaining the language segment sequence; (2) determining, based at least in part on features derived from the language segment sequence, an output score for the output node corresponding to the particular language segment without computing output scores of any other output nodes in the output layer of the unnormalized neural network language model (e.g., an output score $o_i$ for the ith output node); (3) determining, based at least in part on the features, an output score for the normalizer node (e.g., the output score $\eta$); and (4) determining the likelihood based on the output score for the first output node and the output score for the normalizer node (e.g., $q_i = e^{o_i - \eta}$). The output score for the normalizer node may provide an estimate of the sum of output scores in the unnormalized neural network language model that correspond to language segments in the vocabulary (e.g., $\eta \approx \Sigma_i o_i$). In turn, the computed likelihood may be used for a language processing task (e.g., ASR, NLU, machine translation, information retrieval, etc.), without being normalized relative to likelihoods that other language segments in the vocabulary may follow the language segment sequence.

In some embodiments, an unnormalized neural network language model may be trained so as to encourage the sum of unnormalized neural network language model likelihoods, obtained in response to applying inputs to the UNNLM, to be close to one. As such, the procedure for training an unnormalized neural network language model is different from the procedure for training a conventional NNLM because it encourages likelihoods obtained by using the trained UNNLM to be approximately normalized. By contrast, a conventional NNLM training procedure would not perform such a function since a conventional NNLM explicitly normalizes the output scores (e.g., by using soft-max normalization as described above).

The inventors have appreciated that using a normalizer node as part of an UNNLM improves the accuracy and stability of techniques for training unnormalized neural network language models. Accordingly, in some embodiments, training an unnormalized neural network language model may comprise estimating parameters associated with a normalizer node such that the output score produced by the normalizer node, in response to inputs provided to the UNNLM, approximates the sum of output scores of output nodes of the UNNLM in response to those same inputs. The normalizer node may be linked to one or more nodes in a hidden layer of the UNNLM and training the UNNLM may comprise estimating weights associated with the links between the normalizer node and the hidden layer node(s). The training may be performed in any suitable way and, in some embodiments, may be performed using an objective function having a generalized minimum Kullback-Liebler (KL) divergence term, a variance regularization penalty term, or any other suitable type of penalty term. In some embodiments, an unnormalized neural network language model may be trained using noise contrastive estimation techniques.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 is a flowchart of an illustrative process 100 for determining a likelihood that a language segment in a vocabulary follows a language segment sequence at least in part by using an unnormalized neural network language model, in accordance with some embodiments. Process 100 may be performed by any suitable computing device or computing devices. For example, process 100 may be performed by computing devices 401, 451, and/or 453 described below with reference to FIGS. 4A and 4B. Process 100 may be performed as part of a language processing application. For example, automatic speech recognition, natural language understanding, machine translation, information retrieval and/or any other suitable language processing application may be performed at least in part by using process 100.

Process 100 begins at act 102, where an unnormalized neural network language model is obtained. This may be done in any suitable way. For example, in some embodiments, parameters representing the unnormalized neural network language model may be received or accessed. The parameters representing the unnormalized neural network language model may have been previously obtained when the UNNLM was trained (e.g., as described below with reference to FIG. 3). Examples of parameters representing an unnormalized neural network are provided below.

The unnormalized neural network language model, obtained at act 102, may be associated with a vocabulary of language segments in that the UNNLM may be configured to compute a likelihood that a particular language segment in the vocabulary follows a sequence of one or more language segments in the vocabulary. The vocabulary may include at least 1000 language segments, at least 10,000 language segments, at least 50,000 language segments, at least 100,000 language segments, at least 500,000 language segments, at least 1,000,000 language segments, between 1000 and 2,000,000 language segments, and/or any other suitable number of segments. Each language segment in the vocabulary may be a phoneme, a letter, a syllable, a word, a group of two or more words, a phrase, and/or any other type of language segment suitable for use in language modeling, as aspects of the technology described herein are not limited in this respect. In some embodiments, all language segments in a vocabulary may be of the same type. For example, all language segments in a vocabulary may be words.

Figure 2A:
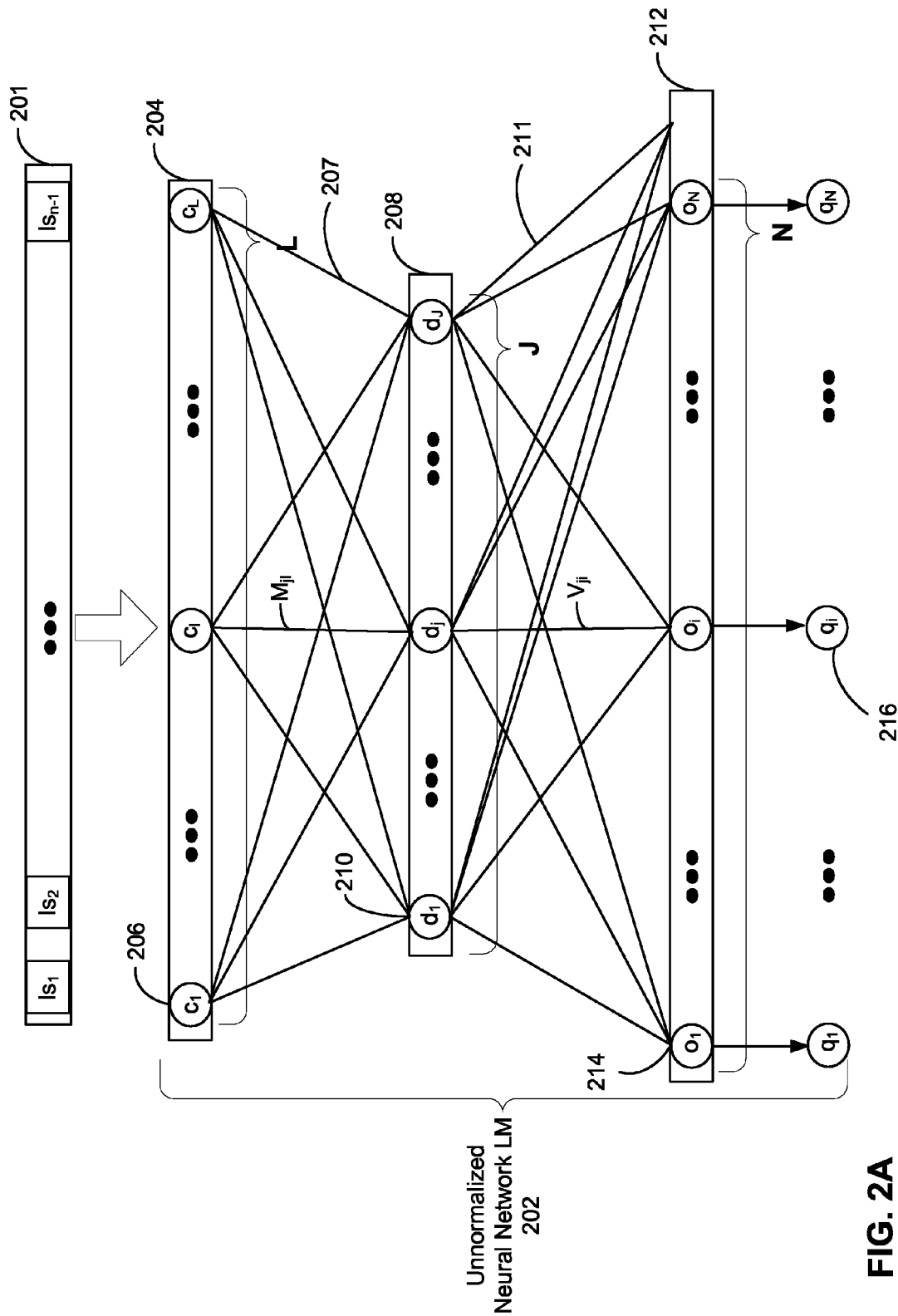
FIG. 2A is a diagram of an unnormalized neural network language model, in accordance with some embodiments of the technology described herein.

FIG. 2A includes a diagram of an illustrative unnormalized neural network language model 202. As illustrated, UNNLM 202 comprises: (1) a projection layer 204 having L projection layer nodes 206, where L is an integer greater than or equal to 1; (2) a hidden layer 208 having J hidden layer nodes 210, where J is an integer greater than or equal to 1; and (3) an output layer 212 having N output layer nodes 214, where N is an integer greater than or equal to 1. Also, as shown, hidden layer nodes 210 are linked to projection layer nodes 206 via links 207. Each of links 207 may be associated with a respective weight, which may be any real number including zero. Similarly, output layer nodes 214 are linked to hidden layer nodes 210 via links 211. Each of links 211 may be associated with a respective weight, which may be any real number including zero.

It should be appreciated that although the illustrative UNNLM network 202 is shown as having three layers, including one projection layer, one hidden layer, and one output layer, aspects of the technology described herein are not limited by this illustrative configuration. An unnormalized neural network language model may have any suitable number of layers of any suitable type. For example, an UNNLM may have one, two, three or more hidden layers and, in some embodiments, may be a deep unnormalized neural network language model. As another example, an UNNLM may have one or more recurrent layers.

In the illustrative UNNLM 202, input values to the hidden layer nodes 210 depend on output values of projection layer nodes 206. Letting output values of projection layer nodes be denoted by $c_1, \ldots, c_L$, the input value of the jth hidden node may be given according to:

$$\sum_{l=1}^{L} M_{jl} c_l + b_j.$$

where $M_{jl}$ is a weight corresponding to the link 207 between the jth hidden layer node and the lth projection layer node, and $b_j$ is a constant offset term for the jth hidden layer node.

The input value to a hidden node may be transformed to obtain an output value of the hidden node. The transformation may be performed by using a so-called "activation" function, which may be a linear or a non-linear function. In some embodiments, the activation function may be a sigmoid function or a hyperbolic tangent function. For example, in embodiments where the activation function is a hyperbolic tangent, the output value of the jth hidden node may be computed from output values of the projection layer nodes according to:

$$d_j = \tanh\left(\sum_{l=1}^{L} M_{jl} c_l + b_j\right).$$

Also, as shown in FIG. 2A, output values of the output layer nodes 214 depend on output values of the hidden layer nodes 210. Let output values of projection layer nodes be denoted by $d_1, \ldots, d_J$, then the output value of the ith output node is given according to:

$$o_i = \sum_{j=1}^{J} V_{ij}d_j + k_i.$$

where $V_{ij}$ is a weight corresponding to the link 211 between the ith output layer node and the jth hidden layer node, and $k_i$ is a constant offset term for the ith output layer node.

The value $o_i$ is referred to herein as an output score for the ith output layer node and may be used to compute a likelihood value $q_i$ indicating a likelihood that the language segment in the vocabulary to which the ith output layer node corresponds follows the sequence of one or more language segments used (as input to the UNNLM 202) to compute the output score $o_i$. The likelihood $q_i$ depends only on output score $o_i$ for the ith output layer node, and it does not depend on output scores for any of the other output layer nodes. The likelihood $q_i$ may be computed as the output score (i.e., likelihood $q_i = o_i$) or as a function of the output score (e.g., as a monotonic function of the output score such as $q_i = e^{o_i}$). In FIG. 2A, the likelihood values are indicated by reference numeral 216.

The illustrative unnormalized neural network language model 202 comprises N output nodes—a node for each language segment in the vocabulary. In this way, each output node corresponds to a respective language segment in the vocabulary and the output score for a particular output node, computed based on features derived from a sequence of one or more language segments, may be used to obtain a likelihood that the particular language segment corresponding to the particular output node follows the sequence of one or more language segments. Although in the embodiment illustrated in FIG. 2A, the UNNLM includes an output node for each language in the vocabulary, in other embodiments, an UNNLM may comprise an output node for each language segment in a subset of the vocabulary, as aspects of the technology described herein are not limited in this respect.

Figure 2B:
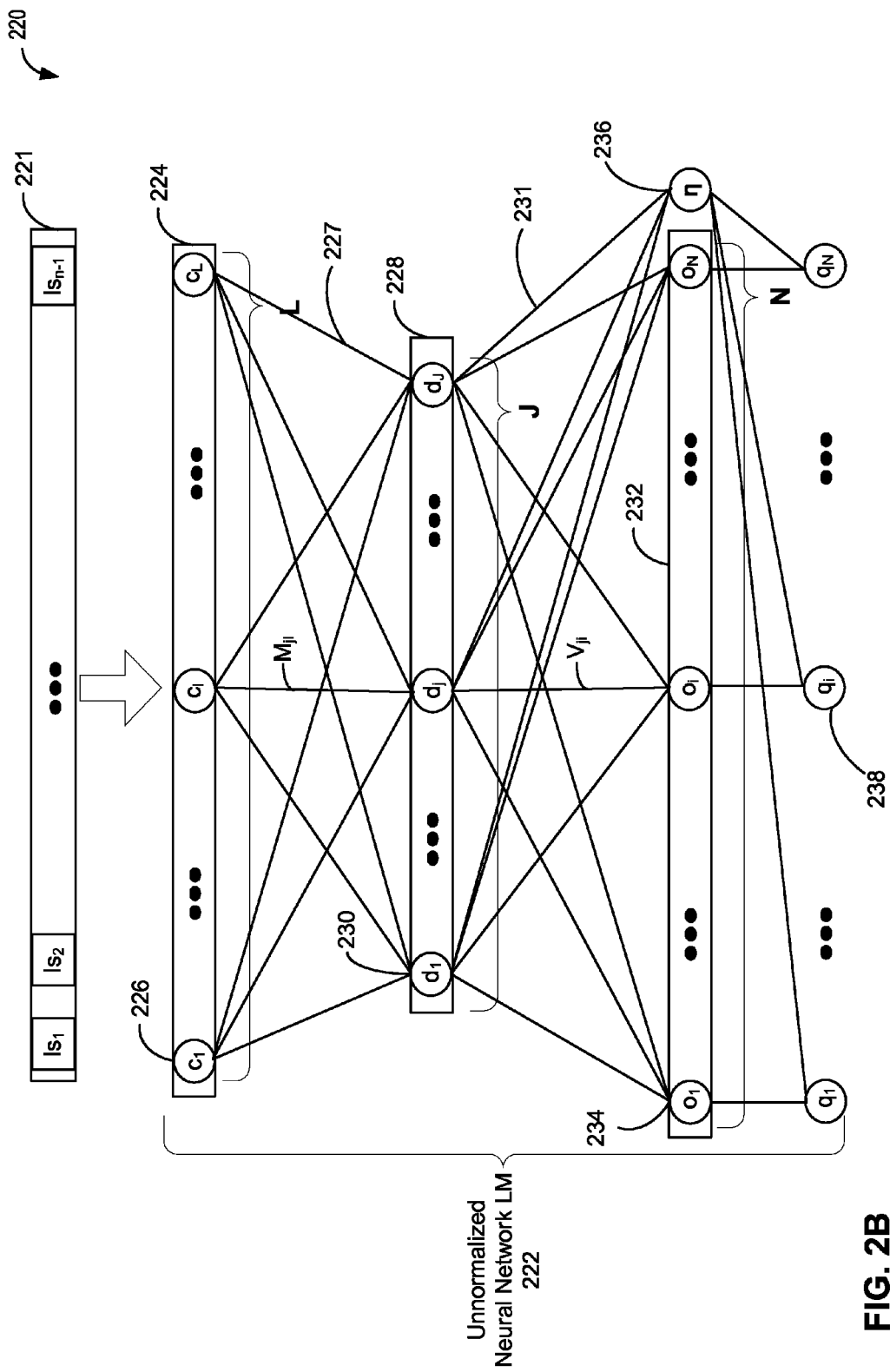
FIG. 2B is a diagram of another unnormalized neural network language model, in accordance with some embodiments of the technology described herein.

FIG. 2B includes a diagram of another illustrative unnormalized neural network language model 222. As illustrated, UNNLM 222 comprises: (1) a projection layer 224 having L projection layer nodes 226, where L is an integer greater than or equal to 1; (2) a hidden layer 228 having J hidden layer nodes 230, where J is an integer greater than or equal to 1; and (3) an output layer 232 having N output layer nodes 234, where N is an integer greater than or equal to 1. Also, as shown, hidden layer nodes 230 are linked to projection layer nodes 226 via links 227. Each of links 227 may be associated with a respective weight, which may be any real number including zero. Similarly, output layer nodes 234 are linked to hidden layer nodes 230 via links 231. Each of links 231 may be associated with a respective weight, which may be any real number including zero.

The UNNLM 222 further comprises a normalizer node 236, which is linked to the hidden layer nodes 230 via links 231. The normalizer node 236 takes as input output values of the hidden layer nodes and outputs a score $\eta$ which serves as an estimate of the sum of output scores of the output nodes 234. That is, the UNNLM 222 is trained such that $$\eta = \sum_{j=1}^{J} V_{j\eta}d_j + k_\eta$$

is a good approximation of $$\sum_{i=1}^{N} o_i,$$

where the value $V_{j\eta}$ is weight of a link between the jth hidden layer node and the normalizer node 236, and $k_\eta$ is a constant offset.

As shown in FIG. 2B, the output score $\eta$ of the normalizer node 236 may be used to determine the likelihood values $q_i$, indicated by reference numeral 238. As such, the likelihood $q_i$ (which is a likelihood that the language segment in the vocabulary to which the ith output layer node corresponds follows the language segment sequence used to compute the output score $o_i$) may be computed based on the output score $o_i$ for the ith output node and the output score $\eta$ of the normalizer node 236. For example, in some embodiments, the likelihood $q_i$ may be computed based on the difference between $o_i$ and $\eta$ (e.g., $q_i = e^{o_i - \eta}$).

Returning to the description of process 100, recall that at act 102, in some embodiments, parameters representing the unnormalized neural network language model may be received or accessed. As may be appreciated from the foregoing discussion of illustrative unnormalized neural network language models 202 and 222, parameters representing an UNNLM may include, but are not limited to, one or more parameters representing weights of links between nodes in the UNNLM (e.g., weights of links among nodes in projection layer 204/224 and nodes in hidden layer 208/228 of UNNLM 202/222, weights of links among nodes in hidden layer 208/228 and output nodes in output layer 212/232 of UNNLM 208/222, and weights of links among nodes in hidden layer 228 and normalizer node 236 of UNNLM 222), one or more constant offset parameters (e.g., parameters $b_j$, $k_i$, and $k_\eta$ discussed above), one or more parameters representing an activation function used in calculating the hidden layer outputs, one or more parameters used for calculating projection layer inputs from an input sequence of one or more language segments (this is discussed in more detail below with reference to act 106 of process 100) and/or any other suitable parameters.

After an unnormalized neural network language model is obtained at act 102, process 100 proceeds to act 104, where a sequence of one or more language segments is obtained. The language segment sequence may be of any suitable length and, for example, may include one segment (as the case may be with bi-gram unnormalized neural network language models), two segments (as the case may be with tri-gram unnormalized neural network language models), and/or n−1 segments (as the case may be with n-gram unnormalized neural network language models for any integer n greater than or equal to 2). Each of the language segments in the sequence may be in the vocabulary with which the UNNLM is associated, and may be of any suitable type (e.g., phoneme, letter, syllable, word, group of words, phrase, etc.).

In some embodiments, the language segment sequence may be obtained via a language processing application such as an ASR application, a machine translation application, an information retrieval application, an NLU application, etc. For example, an ASR application may invoke process 100 (e.g., during and/or for the purposes of decoding) to determine a likelihood that a particular language segment follows a sequence of one or more language segments and may provide the language segment sequence as part of act 104. In some embodiments, obtaining a language segment sequence may comprise receiving the language segment sequence, accessing the language segment sequence, and/or obtaining the sequence in any other suitable way, as aspects of the technology described herein are not limited in this respect.

Next, process 100 proceeds to act 106, where features are obtained from the language segment sequence obtained at act 104. These features in turn may be used as inputs to the unnormalized neural network language model obtained at act 102 in order to compute one or more likelihoods that a particular language segment follows the language segment sequence. For example, the obtained features may be used as values $c_1, \ldots, c_L$, of the projection layer in the UNNLM (e.g., projection layer 204/224 in UNNLMs 202 and 222 described above). The features may be obtained in any suitable way from the language segment sequence. For example, in some embodiments, each segment in the language segment sequence obtained at act 104 may be associated with a numeric representation, which in turn may be used to obtain projection layer values for one or more nodes in the projection layer of an unnormalized neural network language model. As a specific non-limiting example, each language segment in a sequence of n−1 segments may be associated a vector in N-dimensional space (e.g., when the language segment in the sequence is the mth segment in a vocabulary having N segments, the segment may be represented as an N-dimensional unit vector having a non-zero value in the mth coordinate and zeros everywhere else) and the vector may be projected using a suitable projection matrix from N-dimensional space to P-dimensional space. In this way a total of (n−1)*P projected values are obtained, which in this example may be equal to L–the number of projection layer nodes in the UNNLM. In some instances, the same projection matrix may be used to project vectors representing different segments in the language segment sequence. Though it should be appreciated that features may be obtained from a language segment sequence in any other suitable way, as aspects of the technology described herein are not limited in this respect.

Next, process 100 proceeds to act 108, where the unnormalized neural network language model is used to determine a likelihood that a particular language segment follows the language segment sequence obtained at act 104. The particular language segment for which to compute the likelihood at act 108 may be any suitable language segment in the vocabulary associated with UNNLM, and may be identified as a segment for which to compute a likelihood of following the segment sequence in any suitable way. For example, in some embodiments, a language processing application may indicate a language segment for which a likelihood of following the segment sequence is to be computed.

In some embodiments, the likelihood that a particular language segment follows the language segment sequence obtained at act 104 may be determined by using the features, obtained from the language segment sequence at act 106, as inputs to the UNNLM accessed at act 102 to compute an output score for the output node in the UNNLM corresponding to the particular language segment. The likelihood may then be determined based on the computed output score for the output node. In embodiments where the UNNLM comprises a normalizer node (e.g., normalizer node 236 in UNNLM 222 of FIG. 2B), the likelihood may be determined based on the computed output score and an output score of the normalizer node. It should be appreciated that, regardless of whether the likelihood is determined based on an output score of a normalizer node, the likelihood is determined independently of output scores of any other output nodes of the UNNLM that correspond to language segments in the vocabulary. Accordingly, in some embodiments, only the output score of the output node corresponding to the particular language segment may be computed. In this way, the amount of computation in obtaining the likelihood is significantly reduced relative to conventional neural network language models that compute the probability that a particular language segment follows a language segment sequence by computing an output score for each of the language segments in the vocabulary.

For example, as shown in FIG. 2A, an input sequence 201 of n−1 language segments may be used to obtain projection layer values $c_1, \ldots, c_L$, which together with weights $M_{jl}$ and offsets $b_j$ may be used to obtain hidden node output values $d_1, \ldots, d_J$ according to: $d_j = \tanh(\Sigma_{l=1}^L M_{jl}c_l + b_j)$, as described above. Assuming, without loss of generality, that the likelihood $q_i$ of the ith language segment in the vocabulary following the language sequence is being computed, this likelihood may be obtained by first computing the output score $o_i$ for the ith output node corresponding to the ith language segment according to:

$$o_i = \sum_{j=1}^{J} V_{ij}d_j + k_i,$$

and then computing the likelihood as $q_i = e^{o_i}$.

As another example, as shown in FIG. 2B, an input sequence 221 of n−1 language segments may be used to obtain projection layer values $c_1, \ldots, c_L$, which together with weights $M_{jl}$ and offsets $b_j$ may be used to obtain hidden node output values $d_1, \ldots, d_J$ according to: $d_j = \tanh(\Sigma_{l=1}^L M_{jl}c_l + b_j)$, as described above. Assuming, without loss of generality, that the likelihood $q_i$ of the ith language segment in the vocabulary following the language sequence is being computed, this likelihood may be obtained by computing the output score $o_i$ for the ith output node corresponding to the ith language segment according to:

$$o_i = \sum_{j=1}^{J} V_{ij}d_j + k_i,$$

computing the output score η for the normalizer node 236 (which does not correspond to any one language segment in the vocabulary, but rather outputs an estimate of the sum of output scores across all output nodes in the output layer of UNNLM 222) according to:

$$\eta = \sum_{j=1}^{J} V_{j\eta}d_j + k_\eta,$$

and, finally, computing the likelihood as $q_i = e^{o_i - \eta}$.

As can be seen in the above examples, the likelihood $q_i$ of the ith language segment in the vocabulary following the language sequence obtained at act 104 is computed independently of the output scores of any other output nodes (e.g., without output scores $o_m$ for all $1 \leq m \leq N$ and $m \neq i$). For example, the likelihood $q_i$ is computed without being normalized by any function of the output scores of other output nodes of the UNNLM (e.g., without using soft-max normalization). Nor is the likelihood $q_i$ normalized by as a function of the output scores of other output nodes after the likelihood is computed. As such, in some embodiments, the output scores of output nodes, other than the ith output node, are not computed at act 108, which results in significant computational savings. For example, with reference to FIG. 2A, the output scores $o_m$ are not computed for all $1 \leq m \leq N$ and $m \neq i$, which results in computational savings of order N. For instance, the computational cost of obtaining the output score $o_m$ for a single output node may be on the order of the number of nodes in the final hidden layer (e.g., O(H), where H is the number of nodes in the final hidden layer and O(•) is Big-Oh notation), whereas the computational cost of obtaining all the output scores is O(H*N), where N is the number of output nodes in the output layer. These computational savings may be substantial especially when N is large (e.g., at least 50,000, at least 100,000, at least 500,000, etc.) as the case may be in numerous language processing applications such as large-vocabulary automatic speech recognition. The number of nodes in the final hidden layer may be at least 100, at least 1000, between 100 and 5000, and/or any other suitable number of nodes.

Next, process 100 proceeds to decision block 110, where it is determined whether a likelihood of following the segment sequence is to be computed for another language segment in the vocabulary. This determination may be made in any suitable way, as aspects of the technology described herein are not limited in this respect. For example, in some embodiments, a language processing application may be performing a task that requires evaluation of the likelihood that a language segment follows the sequence obtained at act 104 for multiple (e.g., some or all) language segments in the vocabulary. Accordingly, at decision block 110, a determination may be made to compute a likelihood for another language segment until a likelihood is computed for each language segment identified by the language processing application.

When it is determined that a likelihood is to be computed for another language segment, process 100 returns, via the YES branch, to act 108. Otherwise, when it is determined that no further likelihoods are to be computed, process 100 proceeds, via the NO branch, to act 112, where the likelihood(s) computed during process 100 are output. The likelihoods may be output by being stored, provided to another application program or programs, transmitted to another computing device or devices, and/or in any other suitable way. After act 112, process 100 completes.

As described above, likelihoods computed as part of process 100 are not explicitly normalized either as they are being computed or after they have been computed. Thus, a likelihood that a language segment follows a language segment sequence is not normalized based on likelihoods of other language segments in the vocabulary following the segment sequence. The computed likelihood may be used for any suitable language processing task (e.g., ASR, NLU, machine translation, information retrieval, etc.), without being normalized relative to likelihoods that other language segments in the vocabulary follow the segment sequence.

Figure 3:
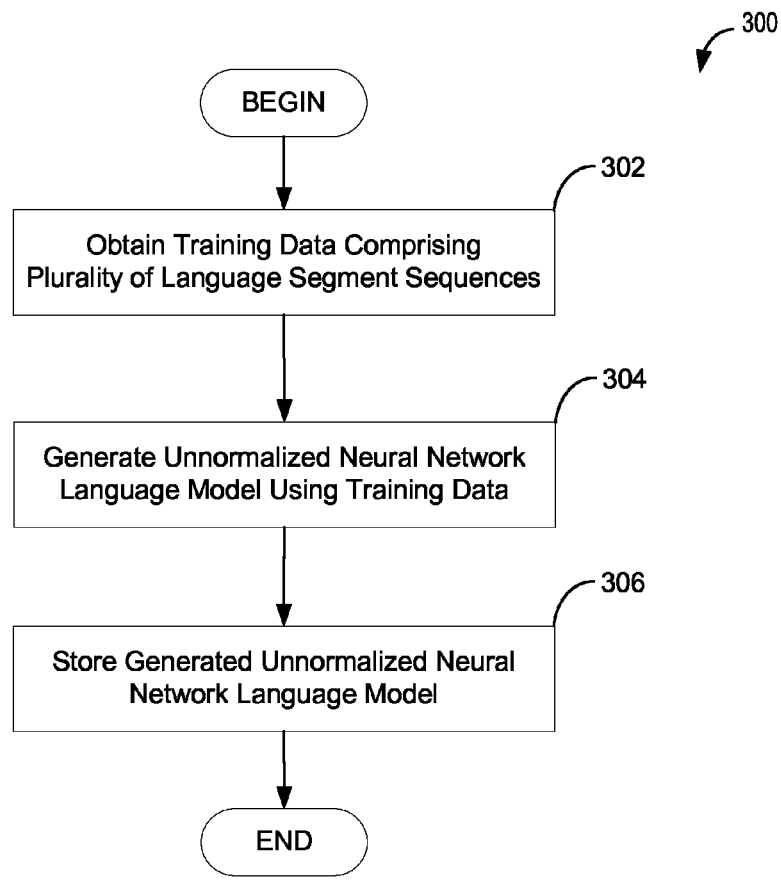
FIG. 3 is a flowchart of an illustrative process for generating an unnormalized neural network language model, in accordance with some embodiments of the technology described herein.

FIG. 3 is a flowchart of an illustrative process 300 for training an unnormalized neural network language model, in accordance with some embodiments of the technology described herein. As described in more detail below, generating an UNNLM may comprise using training data to estimate one or more parameters of the UNNLM (e.g., weights of links among various neural network nodes, constant offsets, etc.). Process 300 may be performed by any suitable computing device or computing devices. For example, process 300 may be performed by computing devices 401, 451, and/or 453 described below with reference to FIGS. 4A and 4B.

Process 300 begins at act 302, where training data for generating an unnormalized neural network language model is obtained. The training data may comprise a plurality of language segment sequences. The training data may comprise any suitable number of language segment sequences of any suitable type, as aspects of the technology described herein are not limited in this respect. For example, in some embodiments, the training data may comprise the same language segment sequences used to train other types of language models (e.g., conventional normalized neural network language models and other types of language models).

Each language segment sequence in the training data may provide at least one example of a language segment following a sequence of language segments. For example, a language segment sequence having n segments provides an example of a language segment (the nth language segment in the sequence) following an (n−1)-segment sequence (the first n−1 language segments in the sequence). Accordingly, in some embodiments, the training data may comprise a plurality of n-segment sequences, where n is any suitable integer greater than or equal to 1. As a specific example, the training data may comprise D n-segment language sequences $z_1, \ldots, z_D$, where each n-segment sequence $z_d = (x_d, y_d)$ includes an (n−1)-segment sequence $x_d$ and a language segment $y_d$ that follows $x_d$ in the sequence $z_d$, and where D is any suitable integer greater than 1.

Next process 300, proceeds to act 304, where an unnormalized neural network language model is trained at least in part by using the training data obtained at act 302. The inventors have appreciated that conventional neural network language training procedures are inapplicable to training unnormalized neural network language models. For example, a conventional neural network language model training procedure, such as an unconstrained maximum likelihood procedure, will not converge when applied to training an unnormalized neural network language model. Conventional training procedures will not produce usable estimates of various UNNLM parameters.

Accordingly, in some embodiments, an unnormalized neural network language model may be trained using an objective function comprising a penalty term designed to encourage output scores of the trained UNNLM to be approximately normalized (e.g., to sum approximately to 1). For example, in some embodiments, an UNNLM may be trained using an objective function comprising a generalized minimum Kullback-Liebler (KL) divergence penalty term. As a specific example, in some embodiments, an UNNLM may be trained using the training data comprising D language segments $\{(x_d, y_d)_{d=1}^D\}$ and the following generalized KL (GKL) objective function:

$$O_{GKL} = \sum_{d=1}^{D} \log\left(e^{o_{y_d}^d}\right) - \sum_{d=1}^{D}\left(\sum_{i=1}^{N} e^{o_{y_i}^d} - 1\right),$$

where the first term $$\left(\text{i.e., } \sum_{d=1}^{D} \log\left(e^{o_{y_d}^d}\right)\right)$$

is an unnormalized likelihood term and the second term $$\left(\text{i.e., } \sum_{d=1}^{D}\left(\sum_{i=1}^{N} e^{o_{y_i}^d} - 1\right)\right)$$

is a generalized minimum KL term. The term $o_{y_i}^d$ denotes the output score of the output node corresponding to the language segment $y_i$ in the vocabulary when computed using features derived from the (n−1)-segment training sequence $x_d$. The term $o_{y_d}^d$ denotes the output score of the output node corresponding to the language segment $y_d$ when computed using features derived from the (n−1)-segment training sequence $x_d$. The integers D and N represent the number of training segments and number of output nodes in the unnormalized neural network language model, respectively. The above objective function may be used to train an unnormalized neural network language model, such as the one shown in FIG. 2A.

In embodiments where an UNNLM has a normalizer node (e.g., as shown in FIG. 2B), the following modified version of the above-described generalized KL objective function may be used:

$$O_{GKL} = \sum_{d=1}^{D} \log\left(e^{(o_{y_d}^d - \eta_d)}\right) - \sum_{d=1}^{D}\left(\sum_{i=1}^{N} e^{(o_{y_i}^d - \eta_d)} - 1\right),$$

where $\eta_d$ represents the output score of the normalizer node when computed using features derived from the (n−1)-segment training sequence $x_d$. This objective function may be used to train an unnormalized neural network language model, such as the one shown in FIG. 2B.

As another example, in some embodiments, an unnormalized neural network language model may be trained using an objective function comprising a variance regularization term. As a specific example, in some embodiments, an UNNLM may be trained using the training data comprising D language segments $\{(x_d, y_d)_{d=1}^D\}$ and the following variance regularization (VarReg) objective function:

$$O_{VarReg} = \sum_{d=1}^{D} \log\left(e^{o_{y_d}^d}\right) - \gamma \sum_{d=1}^{D}\left[\log \sum_{i=1}^{N} o_{y_i}^d\right]^2,$$

where the first term $$\left(\text{i.e., } \sum_{d=1}^{D} \log\left(e^{o_{y_d}^d}\right)\right)$$

is an unnormalized likelihood term and the second term (i.e., $\gamma \Sigma_{d=1}^{D}[\log \Sigma_{i=1}^{N} o_{y_i}^d]^2$) is the variance regularization term. The weight $\gamma$ may be any suitable value and, in some instances, may be a value between 0.5 and 3. In some instances, the unnormalized likelihood values $o_{y_d}^d$ may be replaced by their normalized counterparts, which may make the training procedure more computationally expensive. However, the trained UNNLM would not perform explicit likelihood normalization during runtime, as already discussed. The above variance regularization objective function may be used to train an unnormalized neural network language model, such as the one shown in FIG. 2A.

In embodiments where an UNNLM has a normalizer node (e.g., as shown in FIG. 2B), the following modified version of the above-described variance regularization objective function may be used:

$$O_{VarReg} = \sum_{d=1}^{D} \log\left(e^{(o_{y_d}^d - \eta_d)}\right) - \gamma \sum_{d=1}^{D}\left[\log \sum_{i=1}^{N} (o_{y_i}^d - \eta_d)\right]^2,$$

where $\eta_d$ represents the output score of the normalizer node when computed using features derived from the (n−1)-segment training sequence $x_d$. As discussed above, in some instances, the values $o_{y_d}^d$ may be replaced by their normalized counterparts, which may make the training procedure more computationally expensive. This objective function may be used to train an unnormalized neural network language model, such as the one shown in FIG. 2B.

In some embodiments, instead of using any of the above-described objective functions, noise contrastive estimation (NCE) may be used to train an unnormalized neural network language model. In this approach, rather than optimizing the likelihood of the training data, a number of noise samples may be generated for each of the training samples (e.g., for each of the language segments in the training data). Then, parameters of the UNNLM are trained to optimize performance on the binary prediction task of identifying training data samples as opposed to noise samples. With a sufficient number of noise samples, the solution to the binary prediction task may converge to the maximum likelihood estimate of the UNNLM parameters given the training data.

The noise contrastive estimation objective function may depend on the likelihood of a training data sample or a noise sample, which may be calculated according to $$e^{o_{y_d}^d},$$

when the UNNLM does not include a normalizer node, and according to $$e^{(o_{y_d}^d - \eta_d)},$$

when the UNNLM does include the normalizer node. Accordingly, in embodiments where the UNNLM includes a normalizer node, the parameters of the UNNLM including the parameters of the normalizer node are estimated jointly according to the noise contrastive estimation objective function.

It should be appreciated that the above-described objective functions are illustrative and that an UNNLM may be trained using any other suitable objective function such as, for example, any suitable objective function that encourages the sum of the unnormalized likelihoods to be close to one. Regardless of the type of objective function selected, the objective function (and, optionally, its gradients and/or higher-order derivatives with respect to the UNNLM parameters being estimated) may be used to train the UNNLM by identifying parameters of the UNNLM that optimized (e.g., maximize) the value of the objective function for at least a subset of the training data.

Next, process 300 proceeds to act 306, where the generated unnormalized neural network language model is stored. This may be done in any suitable way. For example, in some embodiments, the parameters of the trained UNNLM may be stored on at least one non-transitory computer-readable medium. As another example, the parameters of a trained UNNLM may be transmitted to one or more other computing devices. After act 306, process 300 completes.

Figure 4A:
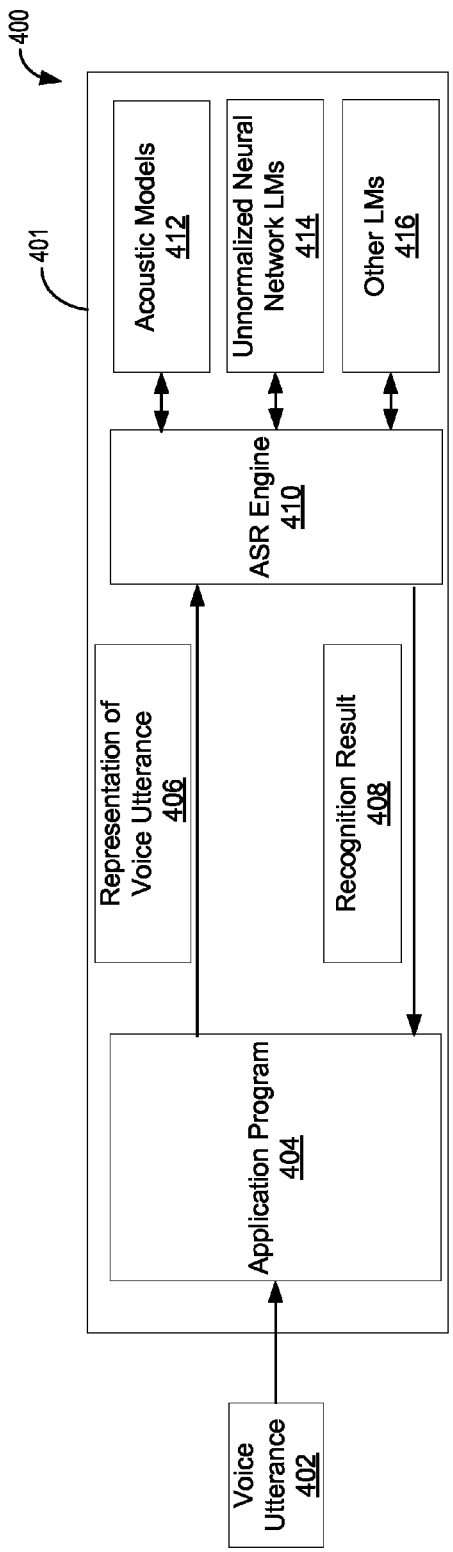
FIG. 4A shows an illustrative environment in which some embodiments of the technology described herein may operate.

FIG. 4A shows an illustrative environment 400 for use in connection with automated speech recognition, in accordance with some embodiments. As shown in FIG. 4A, in some embodiments, a client device may execute an automated speech recognition engine, which is a software program that performs ASR on audio data, and an application program and/or an operating system may use the ASR engine to obtain a recognition result of the audio data. The ASR engine may perform automated speech recognition on audio data using one more unnormalized language models (e.g., unnormalized neural network language models) described herein and/or any other suitable type of models.

In FIG. 4A, client device 401 executes application program 404 and an ASR engine 410. When application program 404 (and/or an operating system executing on the client device 401) receives a voice utterance 402, it may provide a representation 406 of the voice utterance 402 to ASR engine 410. ASR engine 410 may perform automated speech recognition on the voice utterance to obtain a recognition result 408, and may return the recognition result 408 to application program 404 for any suitable subsequent use.

ASR engine 410 may perform automated speech recognition using one or more acoustic models 412 and one or more unnormalized neural network language models 414, in accordance with embodiments described herein. For example, in some embodiments, the ASR engine 410 may use one or more of UNNLMs 414 as part of the decoding process to identify one or multiple potential recognitions of a voice utterance. ASR engine 410 may use one or more other types of language models 416, in addition to or instead of UNNLMs 412.

Client device 401 may be any suitable computing device (e.g., any device with which a user may interact at least in part by speaking). In some embodiments, computing device 401 may be a portable device such as a mobile smart phone, a personal digital assistant, a laptop computer, a tablet computer, or any other portable device with which a user may interact by speaking. Alternatively, the client device 401 may be a fixed electronic device such as a desktop computer, a rack-mounted computer, or any other suitable fixed electronic device.

Some client devices may not have sufficient computing resources to execute an ASR engine that operates with a desired level of accuracy and/or efficiency. For example, a client device may not have sufficient memory to store acoustic models, language models, grammars, and/or other components of such a speech recognizer and/or may not have a processor powerful enough to perform automated speech recognition at a desired level of efficiency. This may occur in any number of situations, such as when the client device is a handheld device, such as a PDA or a mobile phone.

Figure 4B:
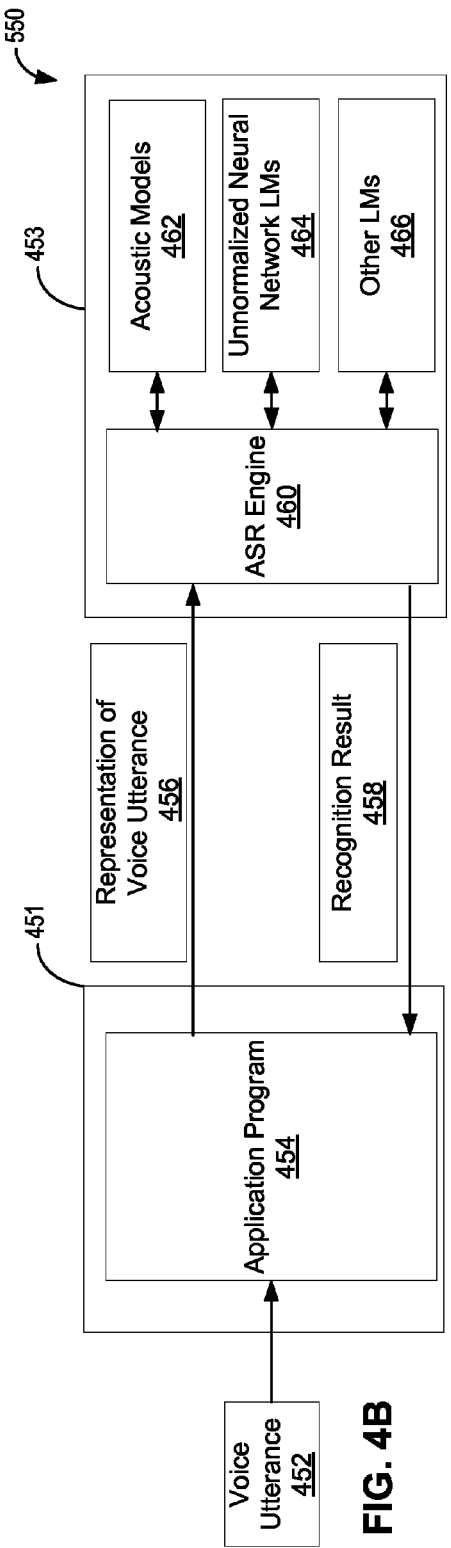
FIG. 4B shows another illustrative environment in which some embodiments of the technology described herein may operate.

Thus, in some embodiments, automated speech recognition of a voice utterance may be performed at least in part by one or more computers external to the client device. As shown in FIG. 4B, client device 451 executes application program 454. When application 454 (and/or an operating system executing on client device 451) receives a voice utterance 452, it may provide a representation of the voice utterance 456 to ASR engine 460 executing on one or more other computing devices such as, for example, server 453. ASR engine 460 may perform automated speech recognition of the voice utterance to obtain a recognition result 458 and may return recognition result 458 to application program 454 for any suitable subsequent use.

ASR engine 460 may perform automated speech recognition using one or more acoustic models 462 and one or more unnormalized neural network language models 464, in accordance with embodiments described herein. For example, in some embodiments, the ASR engine 460 may use one or more of UNNLMs 464 to identify one or multiple potential recognitions of a voice utterance. ASR engine 460 may use one or more other types of language models 466, in addition to or instead of UNNLMs 462.

In the example of FIG. 4A, automatic speech recognition on audio data received at a client device is performed on the client device, and in the example of FIG. 4B, audio data is provided from the client device to one or more other computing devices (e.g., one or multiple servers, a collection of distributed computers of any suitable type, one or more devices part of a cloud computing environment, etc.) and the other computing device(s) perform automatic speech recognition. However, in some embodiments, automatic speech recognition may be performed partially by the client device and partially by the other computer(s). For example, a portion of an ASR process may be performed on the client and a portion may be performed on the other computing device(s). This may be done, for example, to enable the client device to perform a portion of the speech recognition process, but leave computationally intensive portions for the other computing device(s).

It should be appreciated that the techniques described herein are not limited to being used for automatic speech recognition and may be used with any process that may use a language model for any suitable application.

It should also be appreciated that the above described techniques for training and using unnormalized neural network language models are not limited solely to neural network language models and, in some embodiments, may be applied to other types of language models. For example, in some embodiments, the above described techniques may be applied to training unnormalized language models that include one or more parameters for estimating a normalization constant, which estimate may be used to obtain approximately normalized likelihoods. Obtaining approximately normalized likelihoods would thereby avoid the need to compute, explicitly, the normalization constant, which may be computationally expensive. In some embodiments, techniques developed by the inventors may be applied to training and using unnormalized so called "Model M" language models, which as described below, are language models composed of two exponential n-gram models.

An exponential model with parameters $\Lambda = \{\lambda_i\}$ and corresponding features $f_i(x, y), \ldots f_F(x, y)$ may have the form:

$$s(x, y) = \sum_{i=1}^{F} \lambda_i f_i(x, y),$$

and the s(x, y) may be used to calculate language model conditional probabilities p (y|x) according to:

$$p(y \mid x) = \frac{e^{s(x,y)}}{\sum_{y'} e^{s(x,y')}}.$$

An exponential n-gram model, for example with n=3, includes binary features $f_{(x,y)}(\bullet)$ for pairs (x, y) of the form:

$$(\epsilon, w_j), (w_{j-1} w_j), (w_{j-2} w_{j-1}, w_j),$$

where $f_{(x, y)}$ (x, y)=1 iff the history x ends in x and the target word y is y.

Model M is composed of two separate exponential models, one for predicting classes and one for predicting words. Let $P_{ng}$ (y|λ) denote an exponential n-gram model and let $P_{ng}$ (y|λ$_1$, λ$_2$) denote a model containing all features in $P_{ng}$(y|λ$_1$) and $P_{ng}$(y|λ$_2$). Assuming that every word w is mapped to a single word class, the trigram version of Model M may be defined according to:

$$P_M(w_j | w_{j-2} w_{j-1}) \equiv P_{ng}(c_j | c_{j-2} c_{j-1}, w_{j-2} w_{j-1}) \times P_{ng}(w_j | w_{j-2} w_{j-1} c_j),$$

where $c_j$ is the word class of word $w_j$.

In normalized training, the Model M parameters $\lambda_i$, may be chosen to optimize (e.g., maximize) the log likelihood of the training data to the following objective function (in which the regularization term, which may any suitable type of regularization term, is omitted for brevity):

$$O_{norm} = \sum_{d=1}^{D} \log p(y_d \mid x_d) + \text{(regularization)},$$

where the training data includes D n-segment language sequences $z_1, \ldots, z_D$, where each n-segment sequence $z_d = (x_d, y_d)$ includes an (n−1)-segment sequence $x_d$ and a language segment $y_d$ that follows $x_d$ in the sequence $z_d$, and where D is any suitable integer greater than 1. The log likelihood may be proportional to the Kullback-Leibler divergence between the model and the training set distribution.

By contrast, in unnormalized training, the above described objective function may be modified to include a term that penalizes histories $x_d$ when the sum of output scores $\Sigma_y s(x_d, y)$ is far away from 1. In some embodiments, this may be achieved via a generalized likelihood KL penalty term. This translates to adding a penalty of $\Sigma_y e^{s(x_d, y)} - 1$ for each event. Such an objective function may have the following form (with the regularization term again omitted for brevity):

$$O_{GKL} = \sum_{d=1}^{D} s(x_d, y_d) + \sum_{d=1}^{D} \left( \sum_{y} e^{s(x_d, y)} - 1 \right).$$

Note that if $s(x_d, y_d)$ is properly normalized, then the second term in the above described objective function $O_{GKL}$ is 0. To optimize this objective function, iterative scaling and cluster expansion may be used; the expectation computation and parameter updates are unchanged.

For Model M, only the class model is trained with the unnormalized criterion, as the word model is structured such that normalization terms can be precomputed efficiently. However, for normalized class models, there a large computational savings may be realized because the normalizing sum must be computed over a large number of classes.

In addition, the normalization penalty term may be reduced by adding particular types of features to a model. For example, adding features for each n-gram history θ may improve performance (e.g., features of the form $f_\theta(x, y)=1$ if and only if x ends in the n-gram θ).

Figure 5:
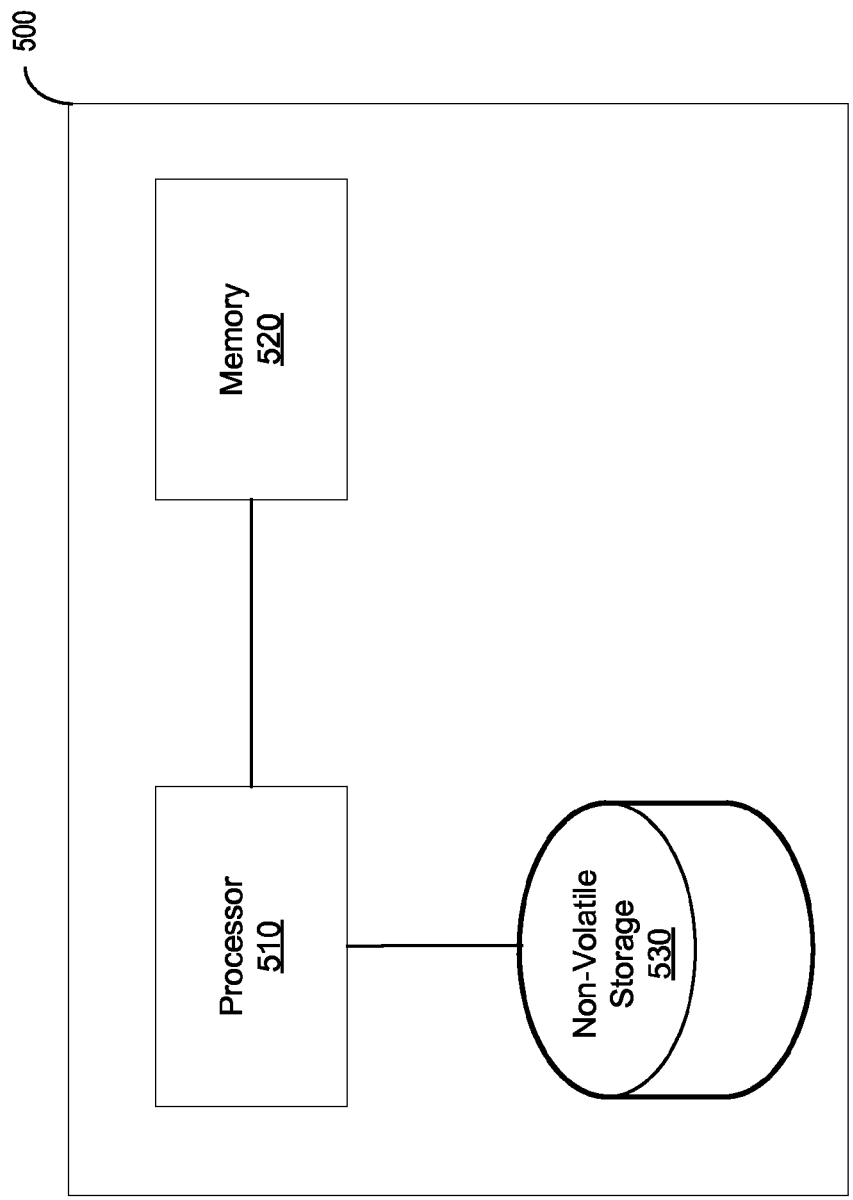
FIG. 5 is a block diagram of an illustrative computer system that may be used in implementing some embodiments.

An illustrative implementation of a computer system 500 that may be used in connection with any of the embodiments of the disclosure provided herein is shown in FIG. 5. The computer system 500 may include one or more processors 510 and one or more articles of manufacture that comprise non-transitory computer-readable storage media (e.g., memory 520 and one or more non-volatile storage media 530). The processor 510 may control writing data to and reading data from the memory 520 and the non-volatile storage device 530 in any suitable manner, as the aspects of the disclosure provided herein are not limited in this respect. To perform any of the functionality described herein, the processor 510 may execute one or more processor-executable instructions stored in one or more non-transitory computer-readable storage media (e.g., the memory 520), which may serve as non-transitory computer-readable storage media storing processor-executable instructions for execution by the processor 510.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method, comprising:
   receiving, at a server, a representation of a voice utterance received by an application program executing on a client device;
   recognizing, using an automated speech recognition (ASR) engine executing at the server, the voice utterance to obtain a recognition result, the recognizing comprising:
      obtaining, based on the voice utterance, a language segment sequence comprising one or more language segments in a vocabulary of language segments;
      accessing an unnormalized neural network language model having a normalizer node and an output layer comprising a plurality of output nodes, each of the plurality of output nodes associated with a respective language segment in the vocabulary, wherein the plurality of output nodes includes a first output node associated with the first language segment in the vocabulary;
      determining the recognition result at least in part by determining, using the unnormalized neural network language model, a first likelihood that a first language segment in the vocabulary follows the language segment sequence, wherein determining the first likelihood comprises:
         determining, based at least in part on features derived from the language segment sequence, an output score for the first output node;
         determining, based at least in part on the features, an output score for the normalizer node; and
         determining the first likelihood based on the output score for the first output node and the output score for the normalizer node,
      wherein determining the first likelihood that the first language segment in the vocabulary follows the language segment sequence is performed independently of output scores of any output nodes, other than the first output node, in the plurality of output nodes; and
   providing, by the server, the recognition result to the application program executing on the client device.

2. The method of claim 1, wherein the output score for the normalizer node is an estimate of a sum of output scores of output nodes in the plurality of output nodes.

3. The method of claim 1, wherein the normalizer node is associated with at least one node in at least one hidden layer of the unnormalized neural network language model, and wherein the normalizer node is not in the plurality of output nodes.

4. The method of claim 1, further comprising using the first likelihood in performing a language processing task without normalizing the first likelihood relative to likelihoods that other language segments in the vocabulary follow the language segment sequence.

5. The method of claim 1, wherein the unnormalized neural network function is trained by using an objective function comprising an unnormalized likelihood term and a generalized minimum KL divergence penalty term or a variance regularization penalty term.

6. A system, comprising:
   at least one non-transitory computer-readable storage medium storing thereon an unnormalized neural network language model having a normalizer node and an output layer comprising a plurality of output nodes, each of the plurality of output nodes associated with a respective language segment in a vocabulary of language segments, wherein the plurality of output nodes includes a first output node associated with the first language segment in the vocabulary; and at least one server configured to perform a method comprising:

receiving a representation of a voice utterance received by an application program executing on a client device;

recognizing, using an automated speech recognition (ASR) engine, the voice utterance to obtain a recognition result, the recognizing comprising:

obtaining, based on the voice utterance, a language segment sequence comprising one or more language segments in a vocabulary of language segments;

accessing the unnormalized neural network language model stored on the at least one non-transitory computer-readable storage medium;

accessing an unnormalized neural network language model having a normalizer node and an output layer comprising a plurality of output nodes, each of the plurality of output nodes associated with a respective language segment in the vocabulary;

determining the recognition result at least in part by determining, using the unnormalized neural network language model, a first likelihood that a first language segment in the vocabulary follows the language segment sequence, wherein determining the first likelihood comprises:

determining, based at least in part on features derived from the language segment sequence, an output score for the first output node;

determining, based at least in part on the features, an output score for the normalizer node; and determining the first likelihood based on the output score for the first output node and the output score for the normalizer node, wherein determining the first likelihood that the first language segment in the vocabulary follows the language segment sequence is performed independently of output scores of any output nodes, other than the first output node, in the plurality of output nodes; and providing the recognition result to the application program executing on the client device.

7. The system of claim 6, wherein the output score for the normalizer node is an estimate of a sum of output scores of output nodes in the plurality of output nodes.

8. The system of claim 6, wherein the normalizer node is associated with at least one node in at least one hidden layer of the unnormalized neural network language model, and wherein the normalizer node is not in the plurality of output nodes.

9. The system of claim 6, further comprising using the first likelihood in performing a language processing task without normalizing the first likelihood relative to likelihoods that other language segments in the vocabulary follow the language segment sequence.

10. The system of claim 6, wherein the unnormalized neural network function is trained by using an objective function comprising an unnormalized likelihood term and a generalized minimum KL divergence penalty term or a variance regularization penalty term.

11. At least one non-transitory computer-readable storage medium storing processor-executable instructions that, when executed by at least one server comprising a computer hardware processor, cause the at least one server to perform a method comprising:

receiving, at the server, a representation of a voice utterance received by an application program executing on a client device;

recognizing, using an automated speech recognition (ASR) engine executing at the server, the voice utterance to obtain a recognition result, the recognizing comprising:

obtaining, based on the voice utterance, a language segment sequence comprising one or more language segments in a vocabulary of language segments;

accessing an unnormalized neural network language model having a normalizer node and an output layer comprising a plurality of output nodes, each of the plurality of output nodes associated with a respective language segment in the vocabulary, wherein the plurality of output nodes includes a first output node associated with the first language segment in the vocabulary;

determining the recognition result at least in part by determining, using the unnormalized neural network language model, a first likelihood that a first language segment in the vocabulary follows the language segment sequence, wherein determining the first likelihood comprises:

determining, based at least in part on features derived from the language segment sequence, an output score for the first output node;

determining, based at least in part on the features, an output score for the normalizer node; and determining the first likelihood based on the output score for the first output node and the output score for the normalizer node, wherein determining the first likelihood that the first language segment in the vocabulary follows the language segment sequence is performed independently of output scores of any output nodes, other than the first output node, in the plurality of output nodes; and providing, by the server, the recognition result to the application program executing on the client device.

12. The at least one non-transitory computer-readable storage medium of claim 11, wherein the output score for the normalizer node is an estimate of a sum of output scores of output nodes in the plurality of output nodes.

13. The at least one non-transitory computer-readable storage medium of claim 11, wherein the normalizer node is associated with at least one node in at least one hidden layer of the unnormalized neural network language model, and wherein the normalizer node is not in the plurality of output nodes.

14. The at least one non-transitory computer-readable storage medium of claim 11, wherein the unnormalized neural network function is trained by using an objective function comprising an unnormalized likelihood term and a generalized minimum KL divergence penalty term or a variance regularization penalty term.

* * * * *